(12) United States Patent
Yeh

(10) Patent No.: US 8,059,230 B2
(45) Date of Patent: Nov. 15, 2011

(54) ILLUMINATOR ASSEMBLY WITH REFLECTIVE PYRAMIDS AND LIQUID CRYSTAL DISPLAY WITH SAME

(75) Inventor: Chih-Chin Yeh, Miao-Li (TW)

(73) Assignee: Chimei Innolux Corporation, Miao-Li County (TW)

( * ) Notice: Subject to any disclaimer, the term of this patent is extended or adjusted under 35 U.S.C. 154(b) by 234 days.

(21) Appl. No.: 12/387,504

(22) Filed: May 4, 2009

(65) Prior Publication Data

US 2009/0273735 A1    Nov. 5, 2009

(30) Foreign Application Priority Data

May 2, 2008    (TW) ................................ 97116305 A

(51) Int. Cl.
  *G02F 1/1335* (2006.01)
  *F21V 7/04* (2006.01)
  *F21V 7/00* (2006.01)
(52) U.S. Cl. ............. 349/67; 349/65; 362/97.1; 362/241
(58) Field of Classification Search .......................... None
  See application file for complete search history.

(56) References Cited

U.S. PATENT DOCUMENTS

| 6,003,996 | A | * | 12/1999 | Furst | 359/549 |
|---|---|---|---|---|---|
| 7,284,874 | B2 | | 10/2007 | Jeong et al. | |
| 7,478,929 | B2 | | 1/2009 | Kim | |
| 7,490,969 | B2 | * | 2/2009 | Sun et al. | 362/612 |
| 7,530,711 | B2 | * | 5/2009 | Bang | 362/241 |
| 7,741,772 | B2 | * | 6/2010 | Lin et al. | 313/500 |
| 7,888,178 | B2 | * | 2/2011 | Wada et al. | 438/113 |
| 2005/0185419 | A1 | * | 8/2005 | Holman et al. | 362/561 |
| 2007/0019412 | A1 | * | 1/2007 | Han et al. | 362/247 |
| 2007/0035968 | A1 | * | 2/2007 | Nakano | 362/612 |
| 2008/0130295 | A1 | * | 6/2008 | Ueda et al. | 362/346 |
| 2008/0211989 | A1 | * | 9/2008 | Park | 349/64 |
| 2008/0247172 | A1 | * | 10/2008 | Beeson et al. | 362/308 |
| 2009/0268430 | A1 | * | 10/2009 | Suzuki et al. | 362/97.1 |
| 2010/0166407 | A1 | * | 7/2010 | Iwanaga et al. | 396/176 |
| 2010/0284190 | A1 | * | 11/2010 | Oide et al. | 362/282 |

FOREIGN PATENT DOCUMENTS

| CN | 1564066 A | 1/2005 |
|---|---|---|
| CN | 101097344 A | 1/2008 |
| WO | 2007037035 A1 | 4/2007 |

\* cited by examiner

*Primary Examiner* — Tina Wong
(74) *Attorney, Agent, or Firm* — Altis Law Group, Inc.

(57) ABSTRACT

An exemplary illuminator assembly includes light emitting diode (LED) chips and reflective pyramids. The LED chips are arranged in an array and capable of emitting light. The reflective pyramids are arranged in an array complementary to the array of LED chips. Each LED chip is arranged among a plurality of the plurality of reflective pyramids, and each reflective pyramid is arranged among a plurality of the plurality of LED chips. The reflective pyramids include a plurality of reflective surfaces, and the reflective surfaces are inclined to the LED chips and thereby capable of reflecting at least some of the light beams emitted from the LED chips such that the reflected light beams propagate in directions that are closer to a direction normal to the arrays than the directions of said some of the light beams prior to their reflection.

16 Claims, 3 Drawing Sheets

ILLUMINATOR ASSEMBLY WITH REFLECTIVE PYRAMIDS AND LIQUID CRYSTAL DISPLAY WITH SAME

BACKGROUND

1. Technical Field

The present disclosure relates to an illuminator assembly and a liquid crystal display (LCD) employing the illuminator assembly.

2. Description of Related Art

Liquid crystal displays are commonly used as display devices for compact electronic apparatuses, not only because they provide good quality images but also because they are very thin.

Light emitting diodes (LEDs) are commonly used in liquid crystal displays for providing light. A typical LED has a limited range of angles of divergence of light emitted therefrom, due to structural limitations inherent in the LED. In general, a number of LEDs are needed to achieve sufficient brightness for the entire image that is viewed on the screen at the front of the liquid crystal display. As a result, the LEDs may collectively generate an unduly large amount of heat in the liquid crystal display.

What is needed, therefore, is an illuminator assembly that can overcome the described limitation. What is also needed is a liquid crystal display employing the illuminator assembly.

BRIEF DESCRIPTION OF THE DRAWINGS

The components in the drawings are not necessarily drawn to scale, the emphasis instead being placed upon clearly illustrating the principles of at least one embodiment of the present disclosure. In the drawings, like reference numerals designate corresponding parts throughout various views, and all the views are schematic.

DETAILED DESCRIPTION

Reference will now be made to the drawings to describe various embodiments in detail.

Figure 1:
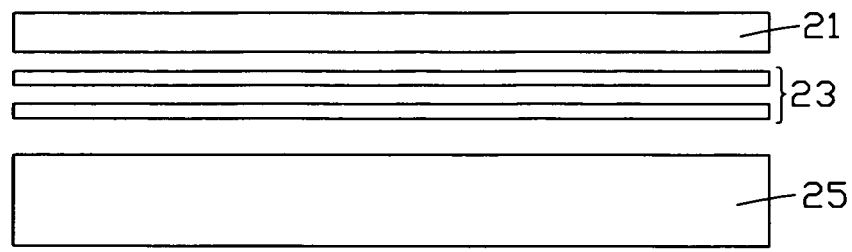
FIG. 1 is an exploded side view of a liquid crystal display according to an exemplary embodiment of the present disclosure, the liquid crystal display including an illuminator assembly.

Referring to FIG. 1, a liquid crystal display 2 according to an exemplary embodiment of the present disclosure is shown. The liquid crystal display 2 includes a liquid crystal panel 21, an illuminator assembly 25 configured for illuminating the liquid crystal panel 21, and an optical film assembly 23 located between the liquid crystal panel 21 and the illuminator assembly 25.

Figure 2:
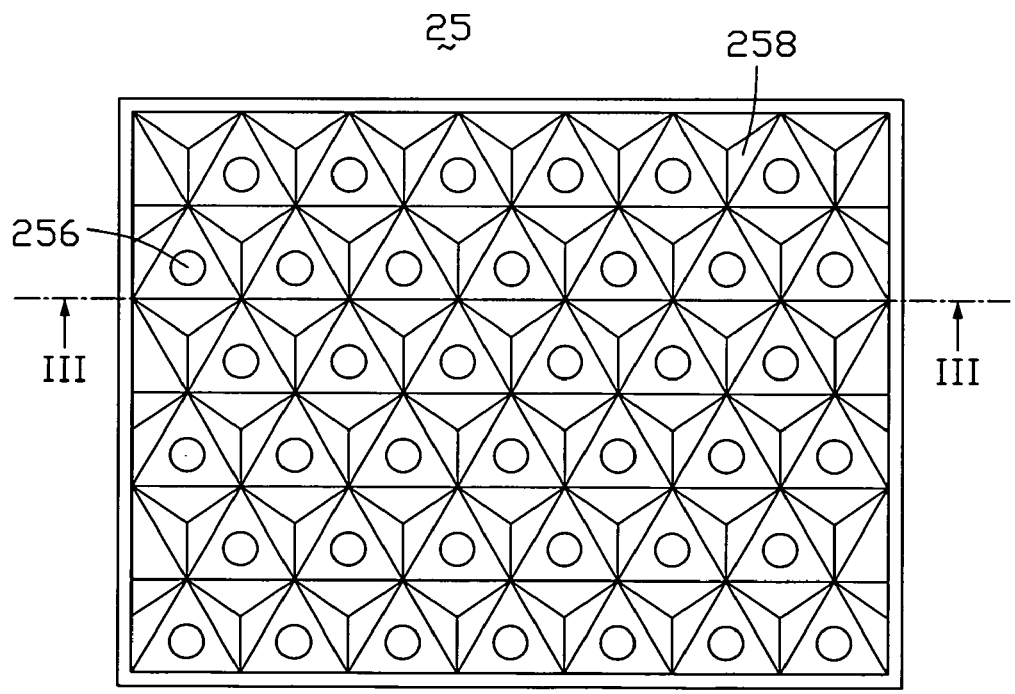
FIG. 2 is an enlarged, top plan view of the illuminator assembly of FIG. 1, the illuminator assembly including a plurality of LED chips and reflective pyramids.
Figure 3:
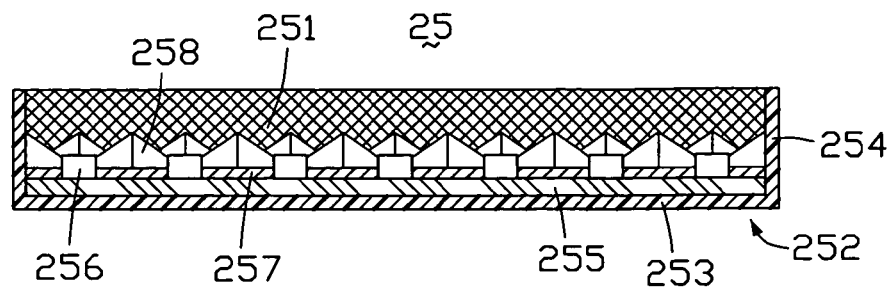
FIG. 3 is a cross-section along line III-III of FIG. 2.

Referring also to FIG. 2 and FIG. 3, the illuminator assembly 23 includes a resin layer 251, a frame 252, a printed circuit board (PCB) 255, a plurality of LED chips 256, a reflective film 257, and a plurality of reflective pyramids 258. The frame 252 includes a bottom plate 253, and a plurality of side plates 254 perpendicularly adjoining the bottom plate 253, thus defining an accommodating housing (not labeled) receiving the resin layer 251, the PCB 255, the LED chips 256, the reflective film 257, and the reflective pyramids 258. The PCB 255 abuts the bottom plate 253 of the frame 252, and is electrically connected to the LED chips 256. The LED chips 256 extend from the PCB 255 in a direction toward an opening (not labeled) of the frame 252, and are spaced from each other. The reflective film 257 covers the PCB 255, and includes a plurality of through holes (not labeled) defined therein through which the LED chips 256 extend. The reflective pyramids 258 are arranged at the reflective film 257. The resin layer 251 covers the LED chips 256 and the reflective pyramids 258.

Figure 4:
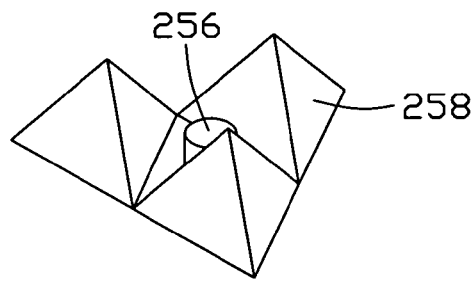
FIG. 4 is an isometric, enlarged view showing a representative set of the pyramids and one LED chip of the illuminator assembly of FIG. 2.

Referring also to FIG. 4, in the illustrated embodiment, the reflective pyramids 258 are triangular pyramids. Each reflective pyramid 258 includes a bottom surface (not labeled) abutting the reflective film 257, and three reflective side surfaces (not labeled) inclined to the reflective film 257. The bottom surface of the reflective pyramid 258 is an equilateral triangle. The LED chips 256 are respectively ringed by the reflective pyramids 258. Most of the LED chips 256 are ringed by three reflective pyramids 258; however, the LED chips 256 at a periphery of the reflective film 257 are ringed by fewer than three reflective pyramids 258. Each ringed LED chip 256 maintains a constant distance from each of the three reflective pyramids 258 by which it is ringed.

In operation, when the LED chips 256 are powered on, light is emitted from the LED chips 256. Each LED chip 256 has an angle of divergence as measured from a front face thereof. The LED chips 256 are arranged such that most of the light emitted therefrom directly propagates toward the optical film assembly 23 and thence to the liquid crystal panel 21. Some of the light emitted from each LED chip 256 propagates toward the side surfaces of the reflective pyramids 258 by which it is ringed. The reflective pyramids 258 are arranged such that the light incident upon the side surfaces thereof can be reflected toward the optical film assembly 23.

With the described configuration, the light from the LED chips 256 can be focused to illuminate the liquid crystal panel 21, with a brightness of the illuminator assembly 25 as viewed from a front (top) side thereof increased accordingly. Thus, to achieve a desired brightness, the liquid crystal display 2 can employ fewer LED chips 256. As a result, heat collectively generated by the LED chips 256 in the liquid crystal display 2 can be kept within safe and acceptable limits.

Figure 5:
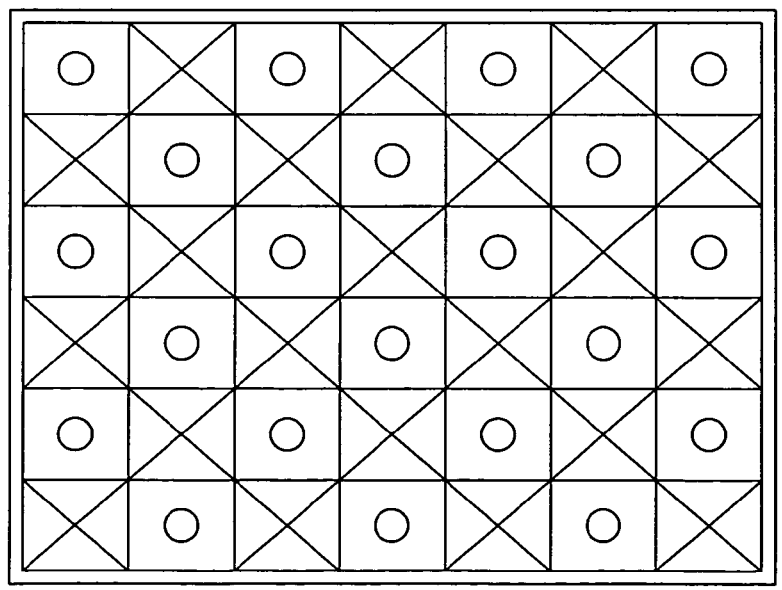
FIGS. 5-7 are similar to FIG. 3, but show alternative examples of LED chips and reflective pyramids.
Figure 6:
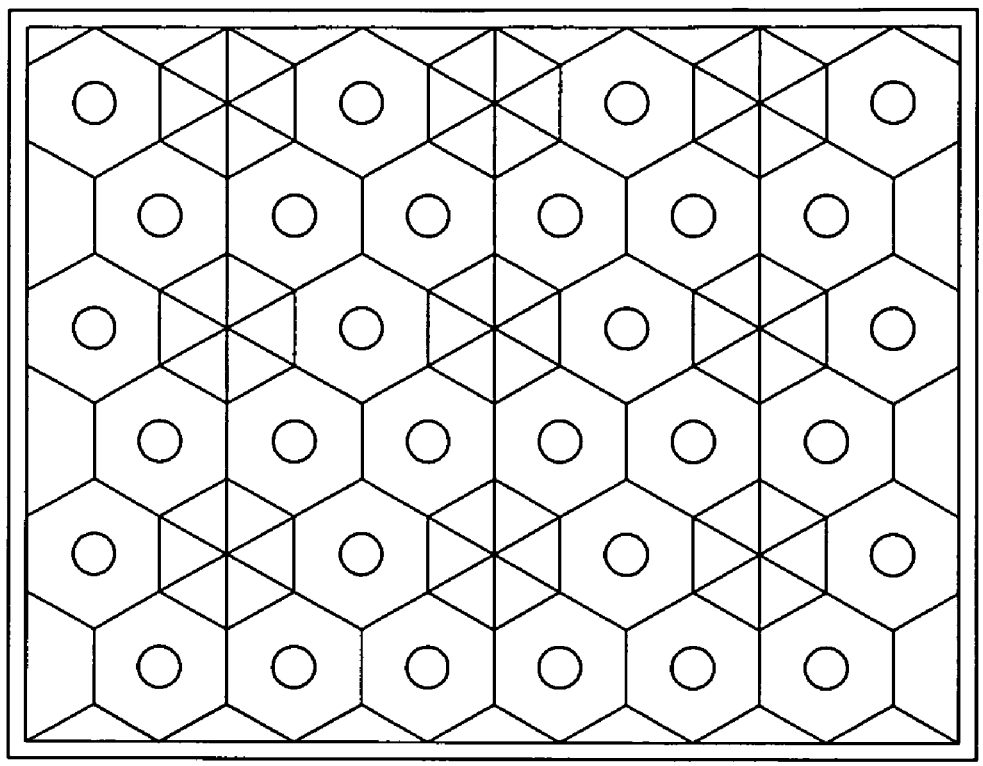
Figure 7:
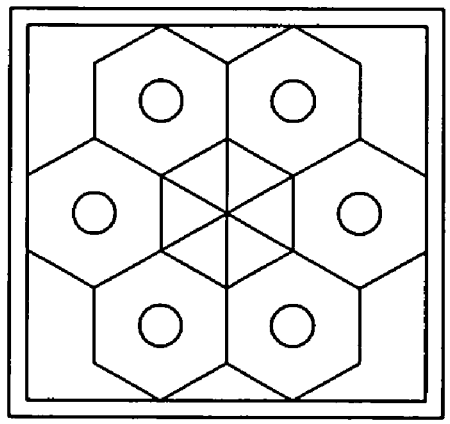

Alternative embodiments can include the following. In a first example shown in FIG. 5, the reflective pyramids can be rectangular pyramids. In a second example shown in FIG. 6, the reflective pyramids can be hexagonal pyramids. In this example, each reflective pyramid is ringed by a plurality of LED chips. As shown in FIG. 7, a representative such reflective pyramid is ringed by six LED chips. The reflective pyramid maintains a constant distance with each of the LED chips by which it is ringed.

It is to be understood, however, that even though numerous characteristics and advantages of preferred and exemplary embodiments have been set out in the foregoing description, together with details of the structures and functions of the embodiments, the disclosure is illustrative only; and that changes may be made in detail, especially in matters of shape, size, and arrangement of parts within the principles of the present disclosure to the full extent indicated by the broad general meaning of the terms in which the appended claims are expressed.

What is claimed is:

1. An illuminator assembly comprising:
a plurality of light emitting diode (LED) chips arranged in an array and capable of emitting light; and
a plurality of reflective pyramids arranged in an array complementary to the array of LED chips, wherein each LED chip is arranged among a plurality of the plurality of reflective pyramids and each reflective pyramid is arranged among a plurality of the plurality of LED chips, each reflective pyramid comprises a base with a geometric shape of at least three sides and at least three sloping reflective surfaces that extend from the at least three sides of the base, respectively, the at least three sloping reflective surfaces each extend up from the corresponding side of the base and narrow in width such that the at least three sloping reflective surfaces converge at a top of the reflective pyramid, and each reflective pyramid is ringed by at least three LED chips with each sloping reflective surface of the reflective pyramid opposite to a corresponding LED chip of the at least three LED chips, the reflective surfaces being inclined to the LED chips and thereby capable of reflecting at least some of the light beams emitted from the LED chips such that the reflected light beams propagate in directions that are closer to a direction normal to the arrays than the directions of said some of the light beams prior to their reflection.

2. The illuminator assembly of claim 1, wherein each reflective pyramid maintains a constant smallest distance from a closest one of the at least three LED chips.

3. The illuminator assembly of claim 1, wherein the reflective pyramids are selected from the group consisting of triangular pyramids, rectangular pyramids, and hexagonal pyramids.

4. The illuminator assembly of claim 1, further comprising a reflective film, wherein the reflective pyramids are arranged at the reflective film with the bases of the reflective pyramids abutting the reflective film.

5. The illuminator assembly of claim 4, further comprising a printed circuit board (PCB) electrically connected to the LED chips, wherein the reflective film comprises a plurality of through holes defined therein, and the LED chips extend from the PCB through the through holes.

6. The illuminator assembly of claim 5, further comprising a resin layer, wherein the resin layer covers the LED chips and the reflective pyramids.

7. A liquid crystal display comprising:
a liquid crystal panel; and
an illuminator assembly positioned for illuminating the liquid crystal panel, the illuminator assembly comprising:
a plurality of light emitting diode (LED) chips arranged in an array and capable of emitting light; and
a plurality of reflective pyramids arranged in an array complementary to the array of LED chips, wherein each LED chip is arranged among a plurality of the plurality of reflective pyramids and each reflective pyramid is arranged among a plurality of the plurality of LED chips, each reflective pyramid comprises a base with a geometric shape of at least three sides and at least three sloping reflective surfaces that extend from the at least three sides of the base, respectively, the at least three sloping reflective surfaces each extend up from the corresponding side of the base and narrow in width such that the at least three sloping reflective surfaces converge at a top of the reflective pyramid, and each reflective pyramid is ringed by at least three LED chips with each sloping reflective surface of the reflective pyramid opposite to a corresponding LED chip of the at least three LED chips, the reflective surfaces being inclined to the LED chips and thereby capable of reflecting at least some of the light beams emitted from the LED chips such that the reflected light beams propagate in directions that are closer to a direction normal to the arrays than the directions of said some of the light beams prior to their reflection.

8. The liquid crystal display of claim 7, wherein each reflective pyramid maintains a constant smallest distance from a closest one of the at least three LED chips.

9. The liquid crystal display of claim 7, wherein the reflective pyramids are selected from the group consisting of triangular pyramids, rectangular pyramids, and hexagonal pyramids.

10. The liquid crystal display of claim 7, further comprising a reflective film, wherein the reflective pyramids are arranged at the reflective film with the bases of the reflective pyramids abutting the reflective film.

11. The liquid crystal display of claim 10, further comprising a printed circuit board (PCB) electrically connected to the LED chips, wherein the reflective film comprises a plurality of through holes defined therein, and the LED chips extend from the PCB through the through holes.

12. The liquid crystal display of claim 11, further comprising a resin layer, wherein the resin layer covers the LED chips and the reflective pyramids.

13. The illuminator assembly of claim 3, wherein the reflective pyramids are rectangular pyramids, each LED chip is ringed by four reflective pyramids, and a corresponding side of the four sides of each base of the four reflective pyramids is nearest to the LED chip such that the LED chip is ringed by the four reflective pyramids.

14. The illuminator assembly of claim 3, wherein the reflective pyramids are triangular pyramids, each LED chip is ringed by three reflective pyramids, and a corresponding side of the three sides of each base of the three reflective pyramids is nearest to the LED chip such that the LED chip is ringed by the three reflective pyramids.

15. The liquid crystal display of claim 9, wherein the reflective pyramids are rectangular pyramids, each LED chip is ringed by four reflective pyramids, and a corresponding side of the four sides of each base of the four reflective pyramids is nearest to the LED chip such that the LED chip is ringed by the four reflective pyramids.

16. The liquid crystal display of claim 9, wherein the reflective pyramids are triangular pyramids, each LED chip is ringed by three reflective pyramids, and a corresponding side of the three sides of each base of the three reflective pyramids is nearest to the LED chip such that the LED chip is ringed by the three reflective pyramids.

* * * * *